(12) United States Patent
Song et al.

(10) Patent No.: US 11,278,847 B2
(45) Date of Patent: Mar. 22, 2022

(54) REVERSE OSMOSIS MEMBRANE WITH HYDROGEL COATING

(71) Applicant: NL Chemical Technology, Inc, Mount Prospect, IL (US)

(72) Inventors: Qun Song, Gurnee, IL (US); Jane C. Li, Arlington Heights, IL (US); Norman N. Li, Arlington, IL (US)

(*) Notice: Subject to any disclaimer, the term of this patent is extended or adjusted under 35 U.S.C. 154(b) by 85 days.

(21) Appl. No.: 16/526,703

(22) Filed: Jul. 30, 2019

(65) Prior Publication Data
US 2021/0031149 A1 Feb. 4, 2021

(51) Int. Cl.
| | |
|---|---|
| B01D 69/12 | (2006.01) |
| B01D 69/02 | (2006.01) |
| B01D 71/38 | (2006.01) |
| C02F 1/44 | (2006.01) |
| B01D 71/44 | (2006.01) |
| B01D 69/10 | (2006.01) |
| B01D 67/00 | (2006.01) |

(52) U.S. Cl.
CPC ....... *B01D 69/125* (2013.01); *B01D 67/0088* (2013.01); *B01D 69/02* (2013.01); *B01D 69/105* (2013.01); *B01D 71/38* (2013.01); *B01D 71/44* (2013.01); *C02F 1/441* (2013.01); *B01D 2323/30* (2013.01); *B01D 2325/48* (2013.01)

(58) Field of Classification Search
CPC .... B01D 69/125; B01D 71/56; B01D 61/025; B01D 67/0006; B01D 2323/40; B01D 65/08; B01D 69/10; B01D 69/12; B01D 61/027; B01D 2323/30; B01D 2323/34; C02F 1/441
See application file for complete search history.

(56) References Cited

U.S. PATENT DOCUMENTS

| | | | |
|---|---|---|---|
| 4,277,344 A | 7/1981 | Cadotte | |
| 4,761,234 A | 8/1988 | Uemura | |
| 4,824,443 A * | 4/1989 | Matson | B01D 53/22 95/44 |
| 4,948,507 A | 8/1990 | Tomaschke | |
| 5,242,779 A * | 9/1993 | Mueller-Hess | G03F 7/0125 430/175 |
| 6,177,011 B1 | 1/2001 | Hachisuka | |
| 6,280,853 B1 | 7/2001 | Mickols | |
| 6,413,425 B1 | 7/2002 | Hachisuka | |
| 6,913,694 B2 | 7/2005 | Koo | |
| 7,490,725 B2 | 2/2009 | Pinnau | |

(Continued)

FOREIGN PATENT DOCUMENTS

| | | |
|---|---|---|
| CN | 105617872 | 1/2016 |
| CN | 1047851 | 6/2017 |
| CN | 104785131 | 6/2017 |

OTHER PUBLICATIONS

F. A. Pacheco et al., Characterization of isolated polyamide thin films of RO and NF membranes, J. Mem. Sci.vol. 358 (2010), pp. 51-59.

*Primary Examiner* — Ana M Fortuna

(57) ABSTRACT

A reverse osmosis membrane is disclosed that has a hydrogel disposed on its surface, wherein the hydrogel is formed from a crosslinked polyvinylpyrrolidone or a copolymer of vinyl pyrrolidone. The hydrogel-coated membrane resists fouling by feed water contaminants. The permeate flux rate and salt rejection of the underlying membrane are not negatively affected by the hydrogel coating.

16 Claims, 1 Drawing Sheet

(56) References Cited

U.S. PATENT DOCUMENTS

| | | | |
|---|---|---|---|
| 2007/0251188 A1 | 11/2007 | Niu | |
| 2007/2511883 | 11/2007 | Moriau et al. | |
| 2010/0051538 A1* | 3/2010 | Freeman | B01D 71/60 210/500.33 |
| 2015/0232506 A1* | 8/2015 | Ashitaka | C07K 1/34 210/504 |
| 2016/0114296 A1* | 4/2016 | Weber | B01D 71/80 210/650 |
| 2017/0056840 A1* | 3/2017 | Koehler | B01D 69/125 |
| 2017/0136417 A1* | 5/2017 | Le | C02F 1/441 |
| 2017/0197182 A1* | 7/2017 | Holmberg | B01D 67/0088 |
| 2018/0345230 A1* | 12/2018 | Karns | B01D 53/228 |
| 2018/0369756 A1* | 12/2018 | Strauss | B01D 69/02 |
| 2019/0193033 A1* | 6/2019 | Sahadevan | B01D 71/56 |
| 2020/0238222 A1* | 7/2020 | Strauss | B01D 67/0093 |

* cited by examiner

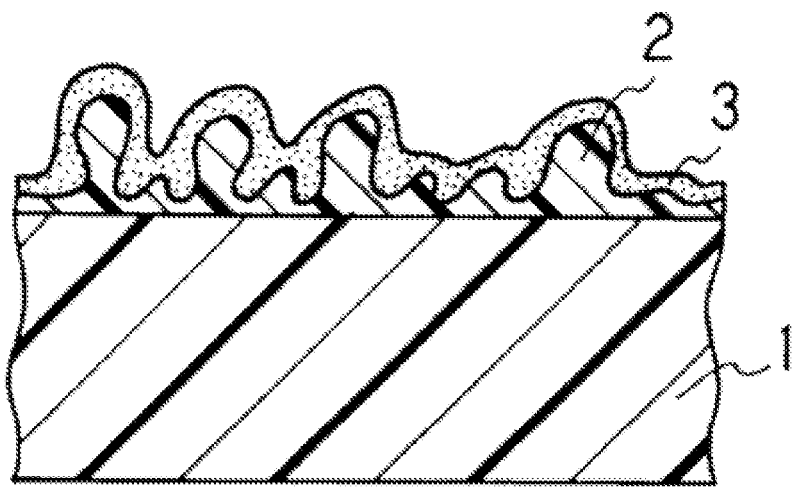

REVERSE OSMOSIS MEMBRANE WITH HYDROGEL COATING

FIELD OF THE INVENTION

The invention relates to reverse osmosis membranes and their manufacture and use. More particularly, the invention relates to reverse osmosis membranes having coatings that provide improved resistance to fouling.

BACKGROUND OF THE INVENTION

Reverse osmosis is widely used to treat water containing dissolved solutes, principally dissolved salts. Treatment is carried out by causing a pressurized stream of water to flow across the feed side of a membrane. Pressure in excess of the osmotic pressure of the feed solution is applied on the feed side, and under this pressure driving force, water molecules pass through the membrane preferentially. The treated water, containing a much lower concentration of salts than the feed water, is withdrawn from the permeate side. Dissolved salts, organic compounds, colloids, microorganisms and any other matter suspended in the water are retained on the feed side in a concentrate that is eventually discarded or disposed.

Almost all reverse osmosis membranes are currently made by interfacial polymerization. In this method, an aqueous solution of a water-soluble monomer, such as a diamine, is deposited in the pores of a microporous support membrane, typically a version of a polysulfone ultrafiltration membrane. The amine-loaded support is contacted with a water-immiscible organic solution containing a reactant, such as a triacyl chloride in a hydrocarbon solvent. The amine and acyl chloride react at the interface of the two immiscible solutions to form an ultrathin crosslinked polyamide membrane layer. Particularly effective reverse osmosis membranes are made using aromatic polyamines (meta-phenylenediamine, benzene-1,3,5-triamine) and polyacyl halides (trimesoyl chloride or its blend with isophthaloyl chloride). Some examples of interfacial polyamide membrane recipes are found in U.S. Pat. Nos. 4,277,344, 4,761,234 and 4,948,507, which patents are hereby incorporated by reference. Current commercial reverse osmosis membranes made by interfacial polymerization have seawater salt rejections of 99+% and water fluxes greater than 0.85 $m^3/m^2$-day at a feed pressure of 800 psig (about twice the osmotic pressure of seawater). Brackish water salt rejections are equally high, with operating pressures dependent upon salt concentrations, which vary from one brackish water source to another.

Primary applications of reverse osmosis membranes are in brackish water and seawater desalination as sources of drinking water, and in purification of water for chemical processes such as semiconductor chip manufacture. In all but small niche market membrane installations, pretreatment of the incoming water source is a major concern. Naturally occurring waters contain various organic and inorganic moieties that deposit as foulants on membrane surfaces. Concentration of inorganic constituents in the feed water such as calcium sulfate or silica can result in crystalline deposits on the membrane surface. Organic matter such as humic acids and other biological cell matter can result in a build-up of sludge-like surface deposits on the membranes. The reverse osmosis membranes, while effecting transport of purified water through the polyamide discriminating layer, are in a sense dirt collectors. They also serve as a scaffold for development of biofilms that include both living and dead biological cell matter. The buildup of foulant layers on membrane outer surfaces eventually results in diminished water permeation rates, and loss of productivity in reverse osmosis operations. Various approaches to reducing fouling have been used. These usually involve pretreatment of the incoming feed stream. But the problem of fouling is also being approached through modification of the membrane surface properties. Potential remedies have included the attachment of hydrophobic or hydrophilic, and/or electronegative or electropositive groups on the membrane surfaces. Other potential remedies have included optimization of module design and arrangement, and resort to periodic cleaning regimes. These methods vary widely in applicability and efficiency and this, in turn, has fostered continuous, on-going efforts to solve fouling problems.

Foulants may include sparingly soluble salts, humic and tannic acids, oils and fats, silica, bio-organisms, and suspended solids. Treatment with cleaning chemicals is commonly instituted on a cyclic basis. With the current focus on utilizing forward osmosis for dewatering of wastewaters, the list of potential foulants and contaminants is greatly expanded. The degree of membrane surface fouling is affected by various factors, including not only the pretreatment of incoming feed water but also the design of membrane modules, presence or absence of mixing or turbulence in the flow channel of the feed water, streaming potential and ionic charges in the membrane discriminating layer, and the surface smoothness or surface texture of the reverse osmosis membrane. With respect to membrane surface texture, current interfacially formed polyamide membranes have a pronounced roughness on a microscopic level. U.S. Pat. No. 7,490,725 shows photomicrographs illustrating the type of surface roughness inherent in these interfacially formed polyamide membranes. Also, an extensive study of the morphology of interfacially formed aromatic polyamide discriminating layers was published by Pacheco et al., Journal of Membrane Science, Vol. 358 (2010), pp. 51-59. One gains an appreciation from this study of the roughness of these interfacially formed aromatic polyamide membrane surfaces and their propensity to fouling One approach to smoother membrane surfaces has been to overcoat the rough surface with a water permeable polymer such as polyvinyl alcohol. Polyvinyl alcohol is prepared by first polymerizing vinyl acetate to make polyvinyl acetate, then saponifying 85% or more of the acetate groups. Highly hydrolyzed polyvinyl alcohol, wherein about 95 to 99% of the acetate groups are saponified, is soluble in hot water but not in cold water. Through use of this phenomenon, membranes have been coated with a layer of highly hydrolyzed polyvinyl alcohol that, upon drying, remains insoluble and in place during reverse osmosis operation, thus presenting a neutral hydrogel surface to feed water containing potential foulants. Coating reverse osmosis membranes with polyvinyl alcohol to reduce the surface roughness has been done, as disclosed in U.S. Pat. Nos. 6,177,011 and 6,413,425, and the coated membranes have shown more stable performance in the presence of various foulants. However, the polyvinyl alcohol coating itself caused around 40% loss of membrane flux compared with uncoated membranes. In a sense, fouling by feed stream contaminants was lessened by first fouling the membrane surface with polyvinyl alcohol. The net result was reduced membrane productivity overall.

Another approach has been the binding of polyalkylene oxide oligomers and polymers to membrane surfaces. In U.S. Pat. No. 6,280,853, epoxy terminated linear polyalkylene oxide oligomers were grafted onto interfacially formed polyamide discriminating layers and provided improved resistance to fouling while offering allegedly excellent flux and salt passage performance. Examples provided in the descriptive embodiments, however, showed flux reductions ranging from 24% to as high as 84% as a result of the surface grafting, with increasing flux loss corresponding to increasing concentration of the oligomers in the grafting step. Along the same line of approach, US Pat. Publ. No. 2007/0251883, disclosed grafting branched poly(alkylene oxide) polymers onto the active surface of polyamide reverse osmosis membranes with the primary intention of inhibiting biofilm attachment and development on the membranes during long term utilization. The coatings typically decreased permeate water fluxes, dramatically so in the case of membranes with very high fluxes, but improved salt rejections in certain cases. In designed operating conditions oriented toward biofilm development, branched poly(alkylene oxide) polymers grafted on the polyamide surface maintained permeate flux better than nontreated membranes and demonstrated superior flux recovery upon cleaning. But this achievement was countered by the initial reductions in flux that were recorded. The net result was reduced membrane productivity.

U.S. Pat. No. 6,913,694 disclosed forming crosslinked hydrophilic coatings on reverse osmosis membranes for improved fouling resistance, coating membrane surface with poly-epoxy compounds, then reacting these compounds with aliphatic polyamines or other epoxy-reactive agents. Improved performance under fouling conditions was observed. Nevertheless, the crosslinked hydrophilic coatings caused significant flux reductions of the coated membranes compared with uncoated membranes. Flux reductions due just to presence of the crosslinked hydrophilic compositions themselves as reported in the examples provided in this disclosure ranged from 15% to as high as 47%. Reduced membrane productivity was the overall result.

U.S. Pat. No. 7,490,725 disclosed the use of polyamide-polyether block copolymers as surface coatings on interfacially formed reverse osmosis membranes as a different route to smoother membrane surfaces. The same problem as with polyvinyl alcohol was encountered, wherein membrane permeate fluxes were reduced, often by more than 40%.

Chinese Pat. No. 105617872 disclosed coating reverse osmosis membranes with a preparation containing polyvinyl alcohol, maleic anhydride, dicumyl peroxide and polyvinylpyrrolidone and heating the coated membrane to greater than 100° C. No permeate flux data were provided. Chinese Pat. No. 104785131 B disclosed coating reverse osmosis membranes with a preparation containing ferric chloride, tannic acid, an aliphatic primary amine and polyvinylpyrrolidone, which preparation resulted in a firm attachment of the polyvinylpyrrolidone, anchored to the polyamide surface by an intermediate layer of a tannic acid-ferric chloride complex. No actual baseline permeate flux data were provided. The problem of flux loss due to the applied coating, evident in the case of the polyvinyl alcohol and polyamide-polyether block copolymer coatings, may be anticipated to occur here as well, especially in view of the nature of tannic acid and ferric compounds as known membrane foulants and their inclusion in this coating.

The problem of fouling of reverse osmosis membranes is always a concern, and the microscopically rough surface texture of high performance aromatic polyamide membranes remains a significant factor in fouling behavior. The application of coatings to smooth the membrane surface texture resulted in each case in a reduction in membrane flux (where flux data were provided) prior to use of the membrane in a fouling environment, such that gains in fouling resistance were undermined by poorer initial membrane flux performances due to the negative effects of the coatings. A need remains for surface coatings that engender resistance to fouling and yet promote full retention of flux and salt rejection performance, particularly initial membrane flux, of the aromatic polyamide membranes that the coatings are applied to.

It is an object of this invention to provide a fouling resistant coating in the form of a hydrogel that does not degrade the underlying membrane's salt rejection and does not impede permeation rates, i.e., water flux through the membrane, and fosters fouling resistance by virtue of its hydrophilicity.

It is another object of this invention to provide a fouling resistant coating that can be applied to the membrane and cured in place, generating a hydrogel that is and remains adherent to the membrane surface during usage both in forward osmosis and reverse osmosis applications.

It is yet another object of this invention to provide a hydrogel coating that can readily be applied to, or formed on, the surface of an interfacially formed aromatic polyamide reverse osmosis membrane in a manufacturing environment involving a continuously moving web.

SUMMARY OF THE INVENTION

These objects are achieved by the present invention wherein the membrane is coated with a hydrophilic coating on the face of the membrane and cured in place. This coating is prepared from a hydrophilic, non-crosslinked polymer that is water soluble, the hydrophilic polymer being subsequently crosslinked, the crosslinking reaction taking place within the coating while in contact with the salt-rejecting layer of the membrane.

In a preferred embodiment, a web having a microporous support layer such as microporous polysulfone is coated with a polyamine in aqueous media, interfacially contacted with a water-immiscible solution of a polyacyl halide to form a polyamide salt-discriminating layer by interfacial reaction, followed by removal of the residual water-immiscible solution solvent. The resulting reverse osmosis membrane is then coated with an aqueous solution containing a water soluble hydrophilic polymer and crosslinking agent, followed by initiation of crosslinking by the crosslinking agent. Intermediate between the coating and crosslinking steps of the hydrophilic polymer, the aqueous coating is preferably dried, so that crosslinking is performed on the composite membrane in a dry state. The crosslinked hydrophilic polymer constitutes a hydrogel. The hydrogel confers upon the reverse osmosis membrane a much improved resistance to fouling by feed water contained contaminants. This may be all accomplished on a moving web such as would be employed in a membrane manufacturing operation.

By the means of this invention, a reverse osmosis membrane has on its surface a hydrogel layer that is both crosslinked and adherent to the discriminating layer of the membrane. The hydrophilic polymer from which the hydrogel is formed is preferably a polymeric derivative of vinyl pyrrolidone, i.e. polyvinylpyrrolidone homopolymer, or a copolymer of vinyl pyrrolidone, or blends of the homopolymer with the copolymer. The coating is in the form of an essentially continuous, defect-free, water swell-able layer fixed upon the surface of the underlying membrane. Furthermore, the coating is resistant to fouling by salts, organic compounds and bio-matter, living or dead, in osmosis and reverse osmosis applications. Surprisingly, the coatings of hydrogels made in conformance with the approach disclosed herein do not alter the flux or salt rejection of the underlying reverse osmosis membrane to any significance, in direct contrast to the behavior of coatings of the prior approaches outlined above.

BRIEF DESCRIPTION OF THE DRAWINGS

FIG. 1 is a schematic drawing of the upper portion of a composite reverse osmosis membrane showing surface texture and having a hydrogel coating.

DETAILED DESCRIPTION OF THE INVENTION

A reverse osmosis membrane may be made of any material, and may take any form, so long as it is capable of performing reverse osmosis, that is, it is capable under a suitable applied fluid pressure of preferentially permeating water and rejecting dissolved solutes, particularly dissolved inorganic salts. In today's realm of reverse osmosis membranes, almost all consist of very thin interfacially formed polyamides resident on a microporous plastic support layers, which in turn are supported on nonwoven webs, the webs usually being formed of a polyester fibrous network. In the context of the present invention, in its most fundamental aspect, the invention is a coated reverse osmosis membrane as indicated schematically in FIG. 1 wherein a polyamide discriminating layer 2 formed on the surface of a microporous layer 1 is coated with a hydrogel layer 3, The fouling resistant membrane of the present invention is a composite structure comprising at least two parts: a reverse osmosis membrane 1, 2 and a coating layer 3, wherein the coating comprises a crosslinked hydrophilic polymer that is adherent to the reverse osmosis membrane top surface. The reverse osmosis membrane itself preferably consists of a thin polyamide discriminating layer 2 supported by an underlayer 1 of an engineering plastic cast into the form of a microporous sheet, usually prepared as by a phase inversion process, When manufactured in sheet-like form, the microporous underlayer of the reverse osmosis membrane is customarily further supported on a nonwoven polyester fabric. The nonwoven web serves a double function, being a carrier for the composite membrane and as a strengthening or reinforcing component for the membrane. The membrane layer composition indicated as 1, 2 in the drawing is often referred to by the appellation "thin film composite" membrane, or more simply as a "composite" membrane, because of the multilayer construction of these membranes.

The crosslinked hydrophilic polymer is adherent, the term "adherent" defined herein to indicate that the crosslinked hydrophilic polymer remains in place on the polyamide discriminating layer during handling and routine operation of the coated membrane in a water treatment application involving osmosis and reverse osmosis. During normal flushing and cleaning treatments such as would be utilized on membrane installations, further including detergents, surfactants, and acidic or alkaline chemicals intended for cleaning membrane surfaces, the crosslinked hydrophilic polymer would remain on the composite membrane surface. The hydrophilic polymer, suitably crosslinked, spontaneously imbibes water when in contact with aqueous media, thereby presenting a water swollen hydrogel surface to a feed water. The term "hydrogel" may be used interchangeably with the phrase "crosslinked hydrophilic polymer" in this invention disclosure and is to be accepted in the context of this invention disclosure as referring to the crosslinked hydrophilic polymer whether in a nascent dry state or a hydrated state.

As per the present invention, polyvinylpyrrolidone or one of its copolymers or a blend thereof is coated onto the surface of a polyamide discriminating layer and crosslinked in place. This coating process may be accomplished as a post-treatment on a pre-made membrane, such as a composite polyamide reverse osmosis membrane made in the manner taught in U.S. Pat. No. 4,948,507 or 4,277,344, for example. Alternatively, the subject coating may be accomplished on a moving web during a membrane fabrication process, e.g., after formation of a discriminating layer by interfacial polymerization of a polyamine and polyfunctional acyl halide but before completion of a final processing step, e.g., turning out a finished membrane in a product roll. The hydrogel-coated membrane may be stored in a wet state or a dr state. The presence of the polyvinylpyrrolidone or its copolymers in the form of hydrogels on the membrane surface renders the membrane less prone to fouling. The hydrogel confers fouling resistance to the membrane.

The phrase "fouling resistance" applied to the art of membranes, as used herein, is defined as making a membrane less susceptible to development of a fouling layer on the membrane surface and further making the removal of a foulant more complete in a membrane cleaning cycle treatment. All membranes become fouled in practice. An important issue in the context of reverse osmosis membranes is the retention of favorable flux and solute rejections that are characteristic of the membrane in its original clean state, including the restoration of such performance characteristics to a high degree upon cleaning as a result of the presence of the hydrogel, in contrast to what would be possible with no such hydrogel coating.

In commercial scale operations, composite membranes are typically made by coating a microporous support with an aqueous solution of a polyfunctional amine monomer, i.e., polyamine, as part of a continuous operation. The polyamine may have primary or secondary amino groups and may be aromatic or aliphatic. Examples of preferred polyamine species include primary aromatic amines having two or three amino groups, most especially meta-phenylene diamine, and secondary aliphatic amines having two amino groups, most especially piperazine. The polyamine is typically applied to the microporous support as a solution in water. The aqueous solution contains from about 0.1 to about 20 weight percent, preferably from about 0.5 to about 6 weight percent polyamine. Small amounts of various organic solvents may be included in the aqueous amine solution for their beneficial effect on the formation of the discriminating layer. Some such additives include surfactants, amine salts, isopropyl alcohol, dimethylsulfoxide and dimethylformamide. Once coated on the microporous support, excess aqueous polyamine solution may be optionally removed.

The coated microporous support is then contacted with a monomeric polyfunctional acyl halide or a blend of acyl halides, preferably in a non-polar organic solvent, although the polyfunctional acyl halide may be delivered from a vapor phase (for polyacyl halides having sufficient vapor pressure). The polyfunctional acyl halides are preferably aromatic in nature and contain at least two and preferably three acyl halide groups per molecule. Because of their lower cost and greater availability, acyl chlorides are generally preferred over the corresponding acyl bromides or iodides. One particularly preferred polyfunctional acyl halide is trimesoyl chloride. The polyfunctional acyl halide is typically dissolved in a non-polar organic solvent in a range of from 0.01 to 1.0 percent by weight, (more preferably 0.05 to 0.3 weight percent), and delivered as part of a continuous coating operation. Suitable non-polar organic solvents are those which are capable of dissolving polyfunctional acyl halides and which are immiscible with water. Preferred solvents include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C. such as C8-C14 hydrocarbons and mixtures thereof have more favorable flashpoints than their C5-C7 counterparts but they are less volatile.

Once brought into contact with the aqueous polyamine solution coated on the microporous support, the polyfunctional acyl halide reacts with the polyamine at the water-solvent interface to form a crosslinked polyamide discriminating layer. The reaction time typically occurs within a few seconds but contact time is often from ten to sixty seconds to allow full development of a polyamide layer thickness, after which excess liquid is customarily removed, e.g., by way of an air knife, water baths and/or a dryer. Washing by sprays, curtain coaters, dip tanks or the like may be added to the membrane finishing process as needed or desired in addition to the interfacial reaction steps. The removal of the excess water and/or organic solvent is most conveniently achieved by drying at elevated temperatures, e.g., from about 40° C. to about 120° C., although air drying at ambient temperatures may be used.

The introduction of the hydrophilic polymer as a surface treatment may be accomplished in a manner easily adapted to the above-described membrane manufacturing processes. One example of the subject invention involves post-treatment of pre-formed composite membranes, either made in-house or acquired as a commercially available product in finished roll form. The post-treatment involves contacting the pre-formed composite membrane with an aqueous solution of polyvinylpyrrolidone or one of its copolymers in combination with one or more crosslinking agents, followed by initiation of crosslinking reactions under conditions suitable for crosslinking to occur subsequent to application onto the surface of the pre-formed membrane. Control of the degree of crosslinking may be exercised through the selection and concentration of crosslink-promoting agent or agents in the coating solution. Ultraviolet light irradiation may be employed as a method of initiating crosslink formation. Depending on the nature of the crosslinking agent, heat as through a drying process through a heated oven may be applicable for initiating or promoting the crosslinking reaction, alone or in conjunction with ultraviolet light irradiation. For purposes of exact control of the degree of crosslinking, irradiation with ultraviolet light appears to be the more advantageous. Irradiation of the hydrophilic polymer as a dry coating with the crosslinking agent entrained therein appears to offer the most control of crosslink density and associated behavior towards foulants in an aqueous feed stream.

Alternatively, development of the hydrogel by crosslinking the hydrophilic polymer coating may be performed as part of the membrane fabrication process. In one preferred embodiment, the freshly formed polyamide discriminating layer (after removal of the water-immiscible organic solvent) is directly contacted with an aqueous solution of polyvinylpyrrolidone or its copolymers, this solution also containing the crosslink-promoting agent or agents. The heat employed to dry the coated reverse osmosis membrane may simultaneously initiate crosslinking of the hydrophilic polymer through concentration of the chemical crosslinking aids as the coated web dries, depending upon the choice of specific crosslinking agents.

Polyvinylpyrrolidone has been widely used in the medical field including as a blood extender, as a lubricant or a lubricating surface, and as a disinfectant when combined with iodine. It's rigorous chemical name is polyvinyl pyrrolidinone, but commonly used names are polyvinylpyrrolidone, Povidone, and simply PVP. It is available in various molecular weight grades, from as low as 10,000 to as high as one million or more. For use as a coating in the context of this invention, a high molecular weight is preferable, allowing less crosslinking agent to be required for insolubilization of the polymer. Vinyl pyrrolidone polymers and copolymers of at least 500,000 molecular weight are preferred. More preferably, molecular weights of 1,000,000 or advantageous in this application. Polymeric derivatives of vinyl pyrrolidone of high degrees of polymerization are usually characterized by light scattering to determine such molecular weights. In the case of expensive crosslinking agents, choice of high molecular weight grades of polymeric vinyl pyrrolidone derivatives is a significant factor in reducing manufacturing cost. By the term "polymeric derivative" is meant a polymer formed, at least in part, of repeating units of vinyl pyrrolidone, and the term is meant to include vinyl pyrrolidone copolymers.

Copolymers of vinyl pyrrolidone are utilizable in the development of the hydrogel coating. In particular, a copolymer of vinyl pyrrolidone with N,N-dimethylamino-ethyl methacrylate has suitable hydrophilicity and is available in a high molecular weight range. Combinations of polyvinylpyrrolidone and one or more of its copolymers may be used in the coating and crosslinking steps. Combinations of various molecular weight grades in the coating solution may be used as well. Thus a polyvinylpyrrolidone of 10,000 molecular weight may be combined with a polyvinylpyrrolidone of one million molecular weight in the coating solution if a beneficial effect of such a combination is found and desired in the resulting hydrogel in a specific membrane application.

Crosslinking agents in the practice of the invention disclosed herein are preferably photo-activated, as by irradiation with ultraviolet light. For a coating process as herein disclosed, photo-reactive agents have the advantage that they can be added at an early step in the fabrication process, then subsequently activated in a later step when desired. Photo-activated crosslinking agents may be chosen from various chemical classes, including aryl azides, diazides, diazirines, aromatic phenones, and peroxides such as benzoyl peroxide. Among suitable choices are: 4-azido-2,3,5, 6-tetrafluorobenzoic acid; 5-azido-2-nitrobenzoic acid N-succinimidyl ester; bis[2-(4-azidosalicylamido)ethyl] disulfide; p-azidobenzoylhydrazide; 4,4'-diazido-2,2'-stilbene disulfonic acid disodium salt (DAS); phenyldiazirine; 4-[3-(trifluoromethyl)-3H-diazirin-3-yl]-benzyl alcohol; 4-[3-(trifluoromethyl)-3H-diazirin-3-yl]-benzyl bromide; 4-[3-(trifluoromethyl)-3H-diazirin-3-yl]-benzoic acid; benzophenone, hydroxyacetophenone; 4-benzoylbenzoic acid N-succinimidyl ester; and benzoyl peroxide. In the invention as disclosed herein, azido derivatives perform well. In examples to follow, a difunctional crosslinking agent DAS (4,4'-diazido-2,2'-stilbene disulfonic acid disodium salt) was chosen for its ability to bond to the pyrrolidone ring and bridge spacial gaps between neighboring polymer chains.

In addition to the polymeric derivative or blends thereof and associated crosslinking agents, other chemicals may be present, either as diluents or aides. But in the preferred embodiments of the crosslinked hydrogels of the invention, the mass of the crosslinked hydrogel (dry basis) will consist of at least 70 percent of vinyl pyrrolidone homopolymer or copolymer or blends thereof, more preferably at least 85 percent, most preferably at least 90 percent. Chemicals such as polyvinyl alcohol, polyalkyleneoxides, and tannic acid have been shown in prior disclosures to result in decreased flux of composite membranes coated with them. While one may deem to blend a portion of such chemicals into the crosslinked hydrogels of the currently disclosed invention, the reality is that optimal results are the result of the nature of polyvinylpyrrolidone and its derivatives being the basic building blocks of the fouling resistant hydrogel coatings, as herein disclosed.

The fouling resistant coating precursor is conveniently applied to the membrane as an aqueous solution of the polymeric derivative of vinyl pyrrolidone, preferably with the crosslinking present as well. The coating may be applied by means of any of several methods, such as by knife over roll, doctor blade, transfer roller, slot die coater, sprayer, wire-wound rod, and the like. The concentration of the polymeric derivative is functional in the range of 0.1 to 10 percent by weight per volume, more preferably in the range of 0.5 to 5 percent by weight per volume.

In the case of aromatic polyamide composite membranes, a finished coating of the dry crosslinked hydrogel will have a variable coating thickness due to the fact that it is applied to the rough surface topography of the interfacially formed polyamide discriminating layer. The equivalent of a film having a thickness of 1 to 5 micrometers if hypothetically coated onto a smooth flat surface has been found to suffice as an anti-fouling coating while allowing full retention of the flux and salt rejection performance of the underlying composite membrane. Thus, for example, an aqueous film of 3.5 percent polymeric derivative doctored onto a composite polyamide membrane at a gap of 25 micrometers and dried would give a dry coating thickness equivalent to a film approximately 4.4 micrometers thick. Such a film, when applied to an aromatic polyamide composite membrane, provides a smoothed, glossy membrane product that is resistant not only to organic fouling but to particulate fouling as well.

The crosslinked hydrogel coating can be made overly thick unnecessarily, such that the hydrogel becomes a flux-limiting coating. Optimal thickness of the anti-fouling coating will depend in part on the water flux of the underlying membrane. Simple trial and error experimentation can determine the most preferable coating thickness for a specific membrane type. Membranes with very high initial water fluxes are preferably matched with anti-fouling vinyl pyrrolidone hydrogels that are on the small end of the thickness range, such that the hydrogel coating does not restrict membrane flux.

In its preferred usage, the crosslinked hydrogel is applied on membranes having a water flux performance of at least 1.0 $m^3/m^2$-day, as this is consistent with current performance of commercial membranes in water treatment, such as in brackish water and seawater desalination. Suitable membranes to be employed with this fouling-resistant coating can be made by interfacial reaction of meta-phenylenediamine with trimesoyl chloride in the general method as follows. A microporous polysulfone support is immersed in an aqueous solution containing meta-phenylenediamine at about 1 to 6 weight percent, preferably about 2 to 5 wt %, accompanied by a salt of camphorsulfonic acid at a concentration of about 1 to 8 wt %, preferably about 3 to 6 wt %. The aqueous amine solution optimally also contains a surfactant at generally about 0.05 to 0.5 wt %, preferably 0.2 to 0.3 wt %. A surfactant chosen from the group sodium dodecylbenzene sulfonate, sodium dodecyl sulfate, sodium lauryl sulfate, or a mixture of these suffices well. The amine-laden polysulfone support is then contacted with a hydrocarbon solution having about 0.05 to 0.5 wt % preferably about 0.1 to 0.3 wt % of trimesoyl chloride, whereby the discriminating layer is interfacially generated. After each step, excess solutions are drained or otherwise removed.

The resulting interfacially generated membrane is generally dried in a circulating air oven at about 60 to 110° C., preferably at about 80 to 90° C., for about 2 to 10 minutes, preferable 4 to 8 minutes. The resulting membrane is washed in water, then dipped in a glycerol solution containing generally about 1 to 10 wt %, preferably about 3 to 8 wt % of glycerol for 5 to 100 seconds, preferably 20 to 80 seconds. At this stage, it is often a practice to coat the membrane with an aqueous solution of water soluble polyvinyl alcohol which, after drying, acts as a protective coating against abrasion during subsequent handling and spiral element manufacturing. In the present invention, coating the membrane instead with the vinyl pyrrolidone derivative, drying it in place, then crosslinking the coating, is practiced, resulting in a fouling resistant membrane with retention of flux and salt rejection performance.

The fouling resistant membranes made in accord with this disclosure are useful in treating both feed waters of good quality and feed waters containing known foulants, including highly contaminated waste waters such as addressed by forward osmosis. In practice, membranes such as disclosed herein are incorporated into spiral wound modules. These modules have feed channels wherein a feed water is passed across a membrane face and permeate is withdrawn from the backside of the same membrane through a permeate channel. Under reverse osmosis conditions, the feed water is pressurized, providing a driving force for permeation of a portion of the water through the membrane. The foulant-depleted permeate is withdrawn as a product stream from one outlet of the module and a foulant-enriched concentrate stream is withdrawn from a second outlet of the module. In forward osmosis, the feed water is not necessarily pressurized, the driving force for water permeation being supplied by a salt solution of high osmotic pressure, the difference in osmotic pressure between the salt solution and the contaminated waste water contributing the driving force.

Specific Embodiments of the Invention

The following examples are provided to illustrate the invention and should not be construed to limit the scope of the appended claims. In these examples, a solution of polyvinylpyrrolidone (PVP) containing 4,4'-diazido-2,2'-stilbene disulfonic acid disodium salt (DAS) as the crosslinking agent was coated onto the surface of a membrane made within the above-described parameters, and excess PVP solution was doctored off by means of a Meyer rod. After the coated membrane was dried, the membrane was then irradiated with ultraviolet light (Heraeus D-bulb, $\lambda \approx 370$ nm, 3 sec).

Water flux and salt rejection were measured using crossflow test cells and apparatus equipped with pressure, flow and temperature controls. Membrane samples were loaded into test cells, then washed with reverse osmosis water at 35° C. for 30 minutes. Membrane samples were then compacted with clean saltwater at a predetermined pressure for 4-24 hours, being tested at 225 psig on 0.2% sodium chloride aqueous feed solution. Permeate samples were collected at various times, starting with collections at one hour for initial performance data. Permeate flux was measured volumetrically and salt rejection was measured conductimetrically. For fouling tests, membrane samples were stabilized by operating at reverse osmosis conditions for a period of 24 hours, then switched to a feed water containing a synthetic fouling combination of 125 ppm sodium alginate, 25 ppm bovine albumin, and 55.5 ppm calcium chloride in 0.2% sodium chloride solution. Flux and salt rejection data were collected as before. After the fouling test, membrane samples were cleaned in place one hour at room temperature, first with an acidic solution at pH 2, then with a basic solution at pH 12, using hydrochloric acid and sodium hydroxide for pH adjustment. The basic solution also contained 200 ppm sodium lauryl sulfate.

A standard reference membrane was made on a pilot plant machine within the above-described parameters. The resulting membrane was washed and dried as described above. Prior to the final drying, the membrane was coated with a water-soluble grade of polyvinyl alcohol in accord with a standard practice in manufacturing a commercial reverse osmosis membrane intended for brackish water application. This membrane exhibited a flux of 1.32 $m^3/m^2$-day and a salt rejection of 99.5%.

Example A

A membrane of the same source (pilot plant machine), but without the polyvinyl alcohol coating, was coated with a solution containing polyvinylpyrrolidone at a concentration of 3 wt % weight percent of PVP, average molecular weight 1,300,000 as determined by light scattering), and DAS in a 50-1 ratio by weight. The coated membrane was dried, then irradiated with UV light for 3 seconds. In reverse osmosis testing, this membrane exhibited a flux of 1.40 $m^3/m^2$-day and 99.5% salt rejection.

Examples B1 and B2

Membranes of the same source (pilot plant machine), but without the polyvinyl alcohol coating, were coated in duplicate with a solution containing 3.5 wt % polyvinylpyrrolidone copolymer with dimethylaminoethyl methacrylate (PVP-DMM) (Sigma-Aldrich, molecular weight 1,000,000) and DAS in a 50-1 ratio by weight in the case of Example B1, and in a 100-1 ratio for Example B2. The coated membranes were dried, then irradiated with UV light for 3 seconds. In reverse osmosis testing, membrane B1 exhibited a flux of 1.28 $m^3/m^2$-day and 99.5% salt rejection. Membrane B2 exhibited a flux of 1.45 $m^3/m^2$-day and 99.5% salt rejection.

Fouling Test 1

A side-by-side fouling test was conducted to determine the fouling resistance of the polyvinylpyrrolidone hydrogel coating in Example with the standard reference membrane, utilizing the alginate/albumin/calcium chloride combination described above. Results are shown in Table 1. The data in Table 1 indicated that the hydrogel coated membrane showed less flux decline during the fouling test than the reference sample, as well as better flux recovery after cleaning.

TABLE 1

|  | Reference Membrane | | PVP Hydrogel Coated Membrane | |
| --- | --- | --- | --- | --- |
| Test time | Flux ($m^3/m^2$-day) | Flux change | Flux ($m^3/m^2$-day) | Flux change |
| Initial | 1.01 | N/A | 1.10 | N/A |
| 20 hrs | 0.89 | −11.9% | 1.04 | −5.4% |
| After cleaning | 0.97 | 96.0% recovery | 1.09 | 99.1% recovery |

Fouling Test 2

A side-by-side fouling test was conducted to determine the fouling resistance of the PVP-DMM copolymer hydrogel coated membranes of Example B with the standard reference membrane, utilizing the alginate/albumin/calcium chloride combination described above. Results are shown in Table 2. The data in Table 2 indicated that the copolymer hydrogel coated membrane showed less flux decline during the fouling test than the reference sample, as well as better flux recovery after cleaning.

TABLE 2

|  | Reference Membrane | | Example B1 Membrane | | Example B2 Membrane | |
| --- | --- | --- | --- | --- | --- | --- |
| Test Time | Flux ($m^3/m^2$-day) | Change | Flux ($m^3/m^2$-day) | Change | Flux ($m^3/m^2$-day) | Change |
| Initial | 1.31 | N/A | 1.32 | N/A | 1.40 | N/A |
| 20 hr | 1.14 | −13.0% | 1.27 | −3.8% | 1.31 | −6.4% |
| After cleaning | 1.26 | 96.2% recovery | 1.34 | 102% recovery | 1.38 | 98.6% recovery |

These examples and test data demonstrate that hydrogel coatings based on polyvinylpyrrolidone and on its copolymers are effective in conferring fouling resistance to reverse osmosis membranes, while at the same time the intrinsic flux and salt rejection characteristics of the reverse osmosis membranes are retained and displayed. And although the invention has been described in considerable detail, both in concepts and experimental examples, many variations and modifications can be made on the invention as above-described without departing from the theme and scope of the invention as it is described in the appended claims. All U.S. patents cited in the background and description above are incorporated herein by reference.

The invention claimed is:

1. A fouling resistant reverse osmosis membrane comprising a composite membrane having water flux and salt rejection performance in an uncoated state, the composite membrane having a top surface formed thereon a cross-linked hydrogel coating comprising a polymeric derivative of vinyl pyrrolidone, the hydrogel coating characterized in that its presence on the composite membrane does not alter water flux and salt rejection performance while conferring resistance to fouling, the polymeric derivative having been crosslinked by reaction with a crosslinking agent, the crosslinked hydrogel coating defining an adherent to the top surface.

2. The membrane of claim 1 wherein the polymeric derivative and a crosslinking agent are reacted with one another while present as a dry deposit on the composite membrane.

3. The membrane of claim 2 wherein crosslinking occurs via activation of the crosslinking agent by irradiation with ultraviolet light.

4. The membrane of claim 2 wherein crosslinking occurs via activation of the crosslinking agent by heat.

5. The membrane of claim 3 wherein the crosslinking agent is a member of the group consisting of aromatic azides, diazides, diaziridines, aromatic phenones, and peroxides.

6. The membrane of claim 2 wherein the polymeric derivative is a homopolymer of vinyl pyrrolidone.

7. The membrane of claim 2 wherein the polymeric derivative is a copolymer of vinyl pyrrolidone with 2-dimethylamino-ethyl methacrylate.

8. The membrane of claim 2 wherein the polymeric derivative is a copolymer of vinyl pyrrolidone with vinyl acetate.

9. The membrane of claim 2 wherein the polymeric derivative is a mixture of a homopolymer with a copolymer of vinyl pyrrolidone.

10. The membrane of claim 3 wherein a ratio of the polymeric derivative to the crosslinking agent is at least 50 to 1 by weight.

11. The membrane of claim 1 wherein at least 90 percent of the crosslinked hydrogel consists of the polymeric derivative of vinyl pyrrolidone.

12. The membrane of claim 1 wherein at least 90 percent of the crosslinked hydrogel consists of either polyvinylpyrrolidone, a copolymer of vinyl pyrrolidone, or a blend of polyvinylpyrrolidone with a copolymer of vinyl pyrrolidone.

13. A process for treating water containing a foulant removable by reverse osmosis, comprising the steps of:

(a) providing a membrane separation device having a feed side and a permeate side and containing the fouling resistant membrane of claim 1;
(b) passing the water across the feed side under reverse osmosis conditions;
(c) removing front the feed side a foulant-enriched water; and
(d) removing from the permeate side a foulant-depleted water.

14. A method of making a fouling resistant reverse osmosis membrane comprising the steps of:

(a) coating a microporous support layer with an aqueous solution comprising a polyamine;
(b contacting the polyamine solution with a solution comprising a polyacyl halide in a hydrocarbon solvent;
(c) forming a polyamide on the surface of the microporous support layer by interfacial reaction of the polyamine with the polyacyl halide, the polyamide having a measurable water flux and a measurable salt rejection performance;
(d) removing the hydrocarbon solvent, thus exposing a surface of the polyamide;
(e) coating the exposed polyamide surface with an aqueous solution comprising a polymeric derivative of vinyl pyrrolidone and a crosslinking agent;
(f) drying the coating of the polymeric derivative of vinyl pyrrolidone and a crosslinking agent; and
(g) irradiating the dry coating of the polymeric derivative of vinyl pyrrolidone with ultraviolet light, thus causing the crosslinking agent to react with the polymeric derivative of vinyl pyrrolidone to convert the coating into a crosslinked hydrogel being an adherent to the microporous support layer, wherein the water flux and the salt rejection performance of the polyamide layer are unchanged by the hydrogel coating.

15. The method of claim 14 wherein the steps are conducted on a moving web.

16. The method of claim 15 wherein the polymeric derivative is polyvinyl pyrrolidone and the crosslinking agent is 4,4'-diazido-2,2'-stilbene disulfonic salt.

* * * * *